(12) United States Patent
Ielsch

(10) Patent No.: US 10,592,175 B2
(45) Date of Patent: Mar. 17, 2020

(54) PRINTABLE IMAGE DATA GENERATION IN LARGE-SCALE PRINTING

(71) Applicant: SICPA HOLDING SA, Prilly (CH)

(72) Inventor: Damien Ielsch, Gex (FR)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 15/326,397

(22) PCT Filed: Jul. 1, 2015

(86) PCT No.: PCT/EP2015/064953
§ 371 (c)(1),
(2) Date: Jan. 13, 2017

(87) PCT Pub. No.: WO2016/012207
PCT Pub. Date: Jan. 28, 2016

(65) Prior Publication Data
US 2017/0212713 A1    Jul. 27, 2017

(30) Foreign Application Priority Data

Jul. 25, 2014 (EP) .................................... 14178511

(51) Int. Cl.
*G06F 3/12* (2006.01)
*G06K 15/02* (2006.01)
*G06K 15/00* (2006.01)

(52) U.S. Cl.
CPC ............ *G06F 3/1211* (2013.01); *G06F 3/124* (2013.01); *G06F 3/1208* (2013.01);
(Continued)

(58) Field of Classification Search
CPC .... G06F 3/1208; G06F 3/1211; G06F 3/1241; G06F 3/1262; G06F 3/1282; G06F 3/124;
(Continued)

(56) References Cited

U.S. PATENT DOCUMENTS

| | | | | |
|---|---|---|---|---|
| 5,602,976 A | * | 2/1997 | Cooper ................. | G06K 15/00 358/1.15 |
| 6,557,017 B1 | * | 4/2003 | Venable ................. | G06T 11/60 345/619 |

(Continued)

OTHER PUBLICATIONS

IPRP (International Preliminary Report on Patentability) issued with respect to Application No. PCT/EP2015/064953 dated Oct. 11, 2016 (13 pages).

(Continued)

*Primary Examiner* — Chad Dickerson
(74) *Attorney, Agent, or Firm* — Muncy, Geissler, Olds & Lowe, P.C.

(57) ABSTRACT

Printing images on a printing medium by means of a printer, comprising the receiving of image data for each image of a list of images to be printed on said printing medium; splitting up of the received image data of the list of images into N successive sequences corresponding to N printing steps, N being an integer greater or equal to 1, of M groups of image data of individual images, M being an integer greater than 1, each group of image data of a printing step comprising image data of at least one individual image, the number of individual images in the M groups of a given printing step corresponding to the total number of images to be printed at this printing step; sequentially for each printing step, distributing of the M groups of image data to, respectively, M distinct processing units, each processing unit sequentially processing image data of each individual image data from a received group of image data to generate a corresponding set of printable individual image data; and upon all said M processing units having each completed generation of a set of printable individual image data from a corresponding group of said corresponding printing step, authorizing of the printer to print the corresponding individual images on the printing medium.

13 Claims, 4 Drawing Sheets

(52) U.S. Cl.
CPC .......... *G06F 3/1218* (2013.01); *G06F 3/1241* (2013.01); *G06F 3/1251* (2013.01); *G06F 3/1262* (2013.01); *G06F 3/1282* (2013.01); *G06K 15/1851* (2013.01)

(58) Field of Classification Search
CPC . G06F 3/1242; G06F 3/1243; G06K 15/1836; G06K 15/1851; G06K 15/1852; G06K 15/1857; G06K 15/1859
USPC .................................. 358/1.11–1.18, 1.9, 2.1
See application file for complete search history.

(56) References Cited

U.S. PATENT DOCUMENTS

| | | |
|---|---|---|
| 2004/0114170 A1 | 6/2004 | Christiansen et al. |
| 2004/0196470 A1* | 10/2004 | Christiansen ......... G06F 3/1204 358/1.1 |
| 2010/0060935 A1* | 3/2010 | Nakao .................... G06F 3/1215 358/1.18 |
| 2011/0235101 A1* | 9/2011 | Misawa ................. G06F 3/1212 358/1.15 |
| 2011/0255124 A1* | 10/2011 | Klassen .................. G06F 3/121 358/1.15 |
| 2012/0243033 A1* | 9/2012 | Hayakawa ......... G06K 15/1822 358/1.15 |
| 2012/0314240 A1* | 12/2012 | Randell ................. G06F 3/1213 358/1.14 |
| 2013/0010325 A1* | 1/2013 | Varga ................. G06K 15/1852 358/1.15 |
| 2013/0038900 A1 | 2/2013 | Henry et al. |

OTHER PUBLICATIONS

International Search Report and Written Opinion issued with respect to application No. PCT/EP2015/064953.

* cited by examiner

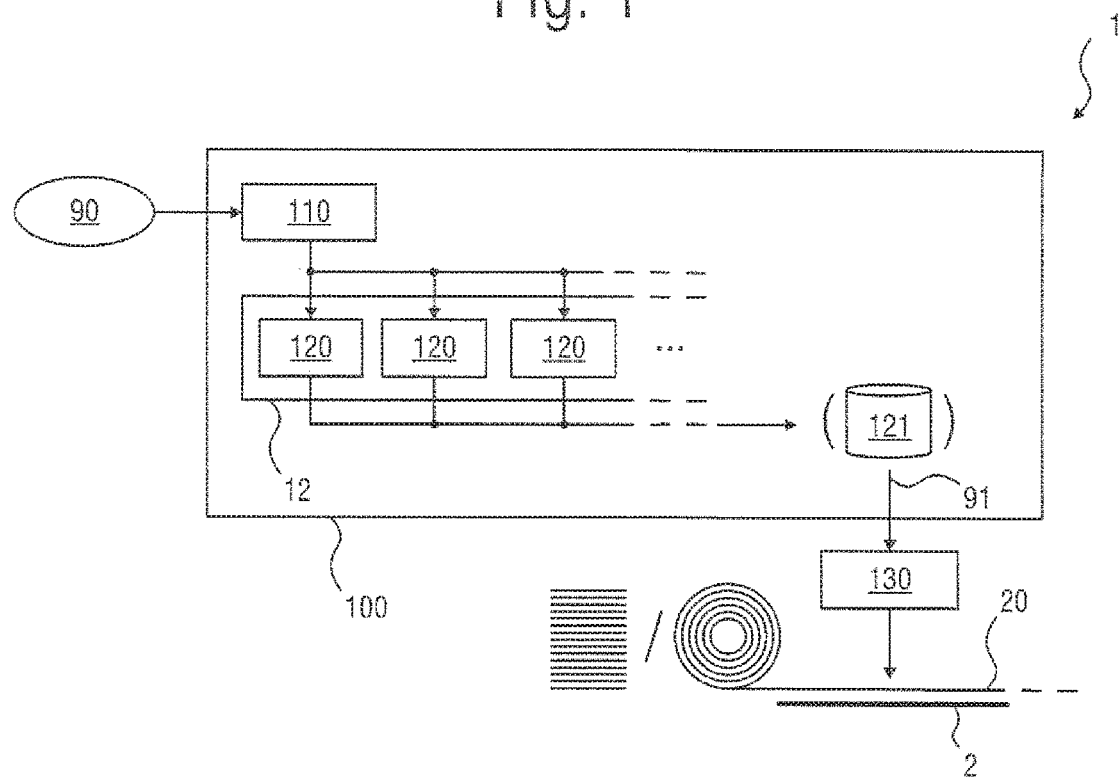
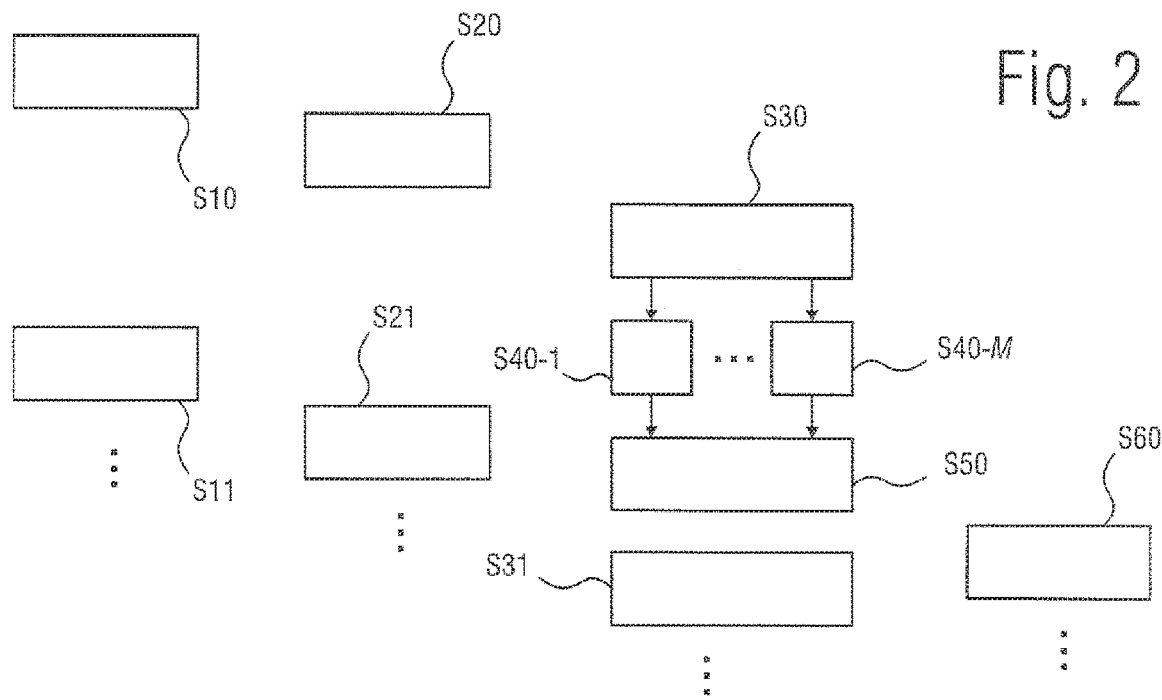

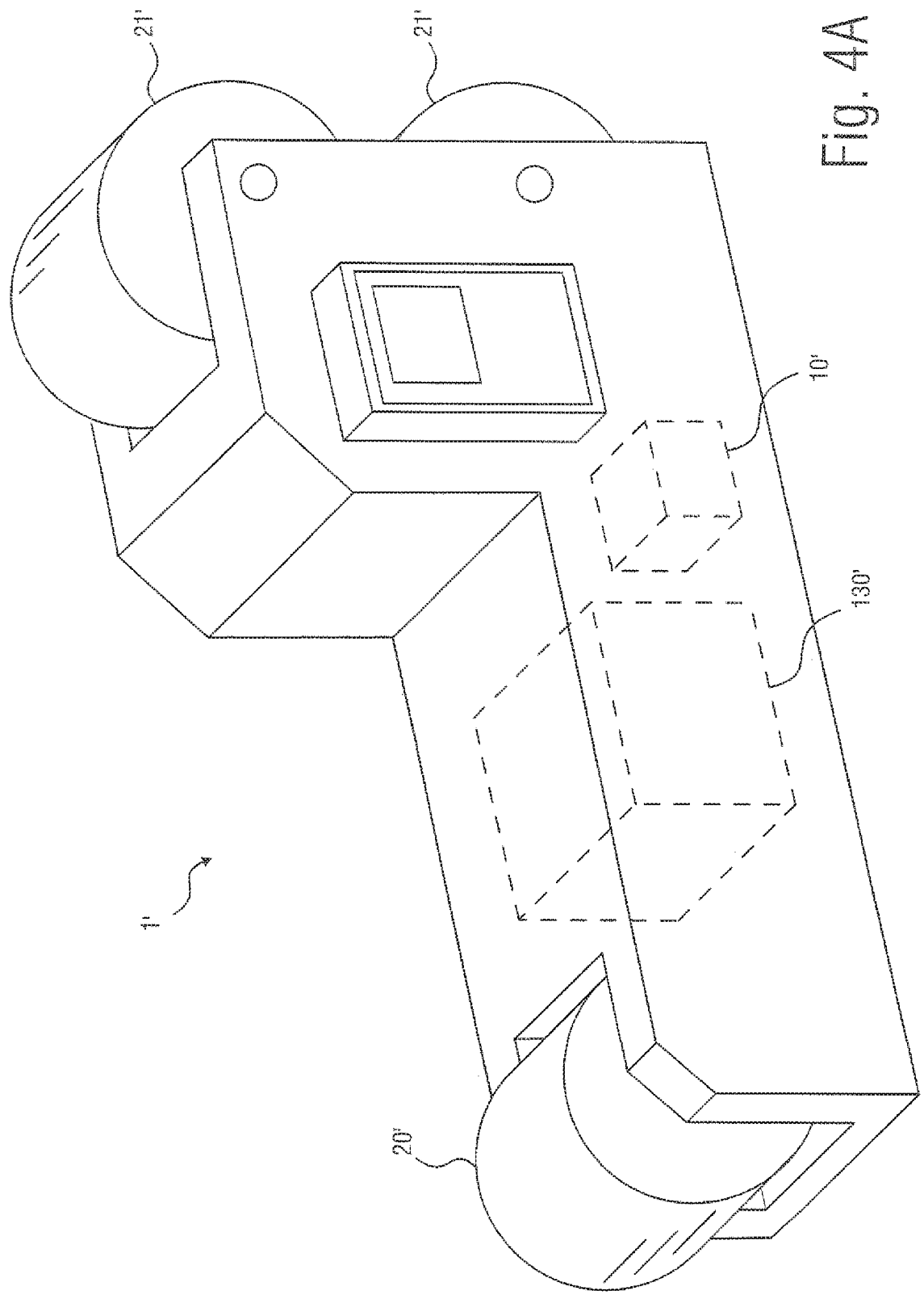

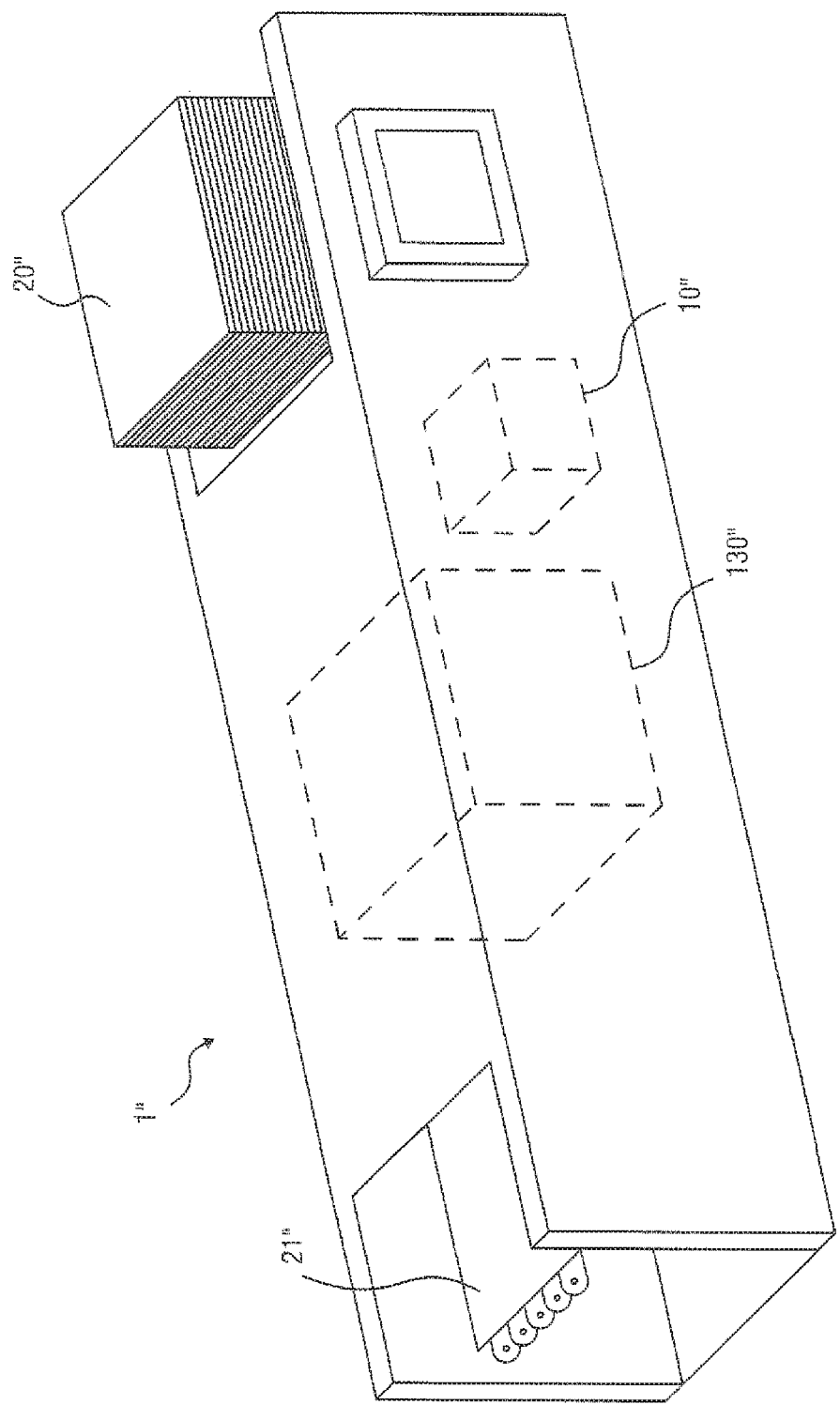

PRINTABLE IMAGE DATA GENERATION IN LARGE-SCALE PRINTING

TECHNICAL FIELD

The present invention relates to the technical field of printing, in particular fast printing and large-scale printing, employing, for example, roll-to-roll, roll-to-reel, roll-to-sheet or sheet-to-sheet printing machines. More particularly, the present invention relates to printing a plurality of images on a printing medium. The present invention likewise relates to corresponding apparatuses and systems.

BACKGROUND

In general, printing of digital data involves processing input printing data so as to generate printable image data that then can be forwarded to the printing equipment carrying out the actual printing (i.e. a "printer"). In this way, the printing equipment can process the printable image data directly so that no further substantial data processing is required. The printing equipment receives the printable image data and can directly proceed to controlling the means that carry out printing.

For example, the printable image data is used in real time to control a laser or an LED-array for exposing a light-sensitive drum which, in turn, transfers toner particles to the printing medium (e.g. paper, plastic sheets, fabrics, and the like). Likewise, the nozzles of an ink-jet print head can be controlled from the printable image data. In other words, the printable image data allows the printing equipment to fulfill printing in the timely order as required by the moving parts, such as the position of a transfer drum or an ink-jet print head.

Whilst most consumer and office printing equipment is in the form of sheet printers (sheet laser printers, sheet ink-jet printers, and the like), these printers usually execute printing jobs on a sheet basis implying that printable image data needs to be present at least for one page before printing of that page can actually initiated. If input data of one printing job is delayed or the generation of corresponding printable image data is delayed, conventional printers usually pause, after the printing of last page for which printable image data was available has completed, and temporarily stop printing. The printing job can be resumed once corresponding and necessary input data has been received and the corresponding printable image data for a subsequent page has been generated. In other words, conventional printers need to have printable image data ready for at least one page, since one page is printed at a time, and pausing the printing process after one page is possible whilst pausing is difficult during printing one page.

Large-scale printing is essentially effected by similar techniques, i.e. by transferring toner particles or ink droplets from a drum or, respectively, an ink-jet nozzle to the printing medium. However, since large-scale printing processes much more medium in time as compared to the above described consumer and office solutions, the employed mechanisms and equipment still differs substantially. Both the above-mentioned sheet-to-sheet or roll-to-sheet printing as well as the roll-to-roll printing are common in large-scale printing applications. Both printing mechanisms require a high-speed throughput of the printing media and a high speed printing process itself. Considering the involved individual components of the printing equipment, such as conveyor drums, transfer drums, fixation, drying and cooling drums, and the like, it becomes clear that a substantial amount of moving/rotating momentum is involved during large-scale printing equipment is in operation.

In the case of roll-to-roll (respectively roll-to-reel) printing, it is further clear that both the input as well as the output roll (resp. reel) possess considerable momentum during operation, so that both acceleration and deceleration to an operation speed or from an operation speed to a hold requires substantial time. In all, a printing job in large-scale printing machines cannot be easily interrupted without disrupting the printing output, requiring a considerable time for decelerating the involved components and for re-starting them after the printing job is to resumed, and causing waste of printing medium.

As a consequence, large-scale printing usually requires the execution of a printing job in one go, meaning that one printing job is finished without interrupting the process by, for example, holding the involved components. However, the necessity for continuously printing without the possibility to pause requires in turn that the printable image data is available for the printing equipment at the given time. In other words, the means that carry out the actual printing need to be fed with the right printable image data at the right time. If there is a delay in providing the printable image data or if there is a disorder in that data, then probably discontinuity or disorder failures may occur which may result in the need to disregard the output of the entire printing job.

At the same time, large-scale printing usually prints identical or similar (related) images in large numbers onto the printing medium. Industrial large-scale printing finds usually its applications in printing one document many times, one image layout (packaging) many times, or related images in considerable numbers. The latter images may be related but—on an individual basis—still different, in the sense of comprising a constant part which is the same for all images and an individual part that varies with the images. Such images can be used, for example, printing authenticity certificates having a common part and an individual part making each certificate unique, for example, by means of a serial number, individual encoded keys, numbers, characters, or one- or two-dimensional and the like.

Common to these above-mentioned large-scale industrial applications is that a plurality of images are printed in an ordered grid so that the printing output can later be cut into the individual sheets, packagings, certificates, or stamps. If the images are individualized, it is usually required to maintain the order so that in the sense of maintaining their physical arrangement order relative to the medium with regard to the corresponding encoded identifier (e.g. serial number and the like).

Due to the above described need for having all the necessary printable image data ready before a printing job can be initiated, conventional methods usually employ generating all the necessary data before the actual printing job is initiated. In this way, it can be ensured that the data is ready when needed so that the printing job needs not to be interrupted. However, this results in a substantial delay in commencing the printing job, since the printable image data need to be generated beforehand. In summary, these conventional concepts result in a low time efficiency and inefficient resource usage. There is therefore a need for improved methods, apparatuses, systems, that allow for a more efficient handling of large-scale printing as compared to the conventional arts.

SUMMARY OF THE INVENTION

The above mentioned objects and problems are met by the subject-matter of the independent claims. Further preferred embodiments are defined in the dependent claims.

In one embodiment of the present invention, there is provided a method of printing images on a printing medium by means of a printer, comprising the steps of: receiving image data for each image of a list of images to be printed on said printing medium; splitting up the received image data of the list of images into N successive sequences corresponding to N printing steps, N being an integer greater or equal to 1, of M groups of image data of individual images, M being an integer greater than 1, each group of image data of a printing step comprising image data of at least one individual image, the number of individual images in the M groups of a given printing step corresponding to the total number of images to be printed at this printing step; sequentially for each printing step, distributing the M groups of image data to, respectively, M distinct processing units, each processing unit sequentially processing image data of each individual image data from a received group of image data to generate a corresponding set of printable individual image data; and upon all said M processing units having each completed generation of a set of printable individual image data from a corresponding group of said corresponding printing step, authorizing the printer to print the corresponding individual images on the printing medium.

In another embodiment of the present invention, there is provided a printer comprising a printing processor for printing images on a printing medium, the printing processor being configured to receive image data for each image of a list of images to be printed on said printing medium; split up the received image data of the list of images into N successive sequences corresponding to N printing steps, N being an integer greater or equal to 1, of M groups of image data of individual images, M being an integer greater than 1, each group of image data of a printing step comprising image data of at least one individual image, the number of individual images in the M groups of a given printing step corresponding to the total number of images to be printed at this printing step; sequentially for each printing step, distribute the M groups of image data to, respectively, M distinct processing units, each processing unit sequentially processing image data of each individual image data from a received group of image data to generate a corresponding set of printable individual image data; and, to, upon all said M processing units having each completed generation of a set of printable individual image data from a corresponding group of said corresponding printing step, authorize the printer to print the corresponding individual images on the printing medium.

In another embodiment of the present invention, there is provided a corresponding large-scale printing machine comprising a printer according to the respective embodiments of the present invention. Said large-scale printing machine may also comprise printing equipment for printing operations involving an input roll (or input sheets), an output roll (or output sheet), and possibly a splicing table for cutting operation on the printed medium and/or a user interface for printing equipment control by a user (including a display for displaying printing operation data, and a keyboard for entering data).

BRIEF DESCRIPTION OF THE DRAWINGS

Embodiments of the present invention, which are presented for better understanding of the inventive concepts and which are not to be seen as limiting the invention, will now be described with reference to the figures in which:

FIG. 1 shows a schematic view of a general system embodiment of the present invention;

FIG. 2 shows a schematic view of a general method embodiment of the present invention;

FIGS. 4A and 4B show schematic views of large-scale printing machines along further embodiments of the present invention.

DETAILED DESCRIPTION

Figure 3:
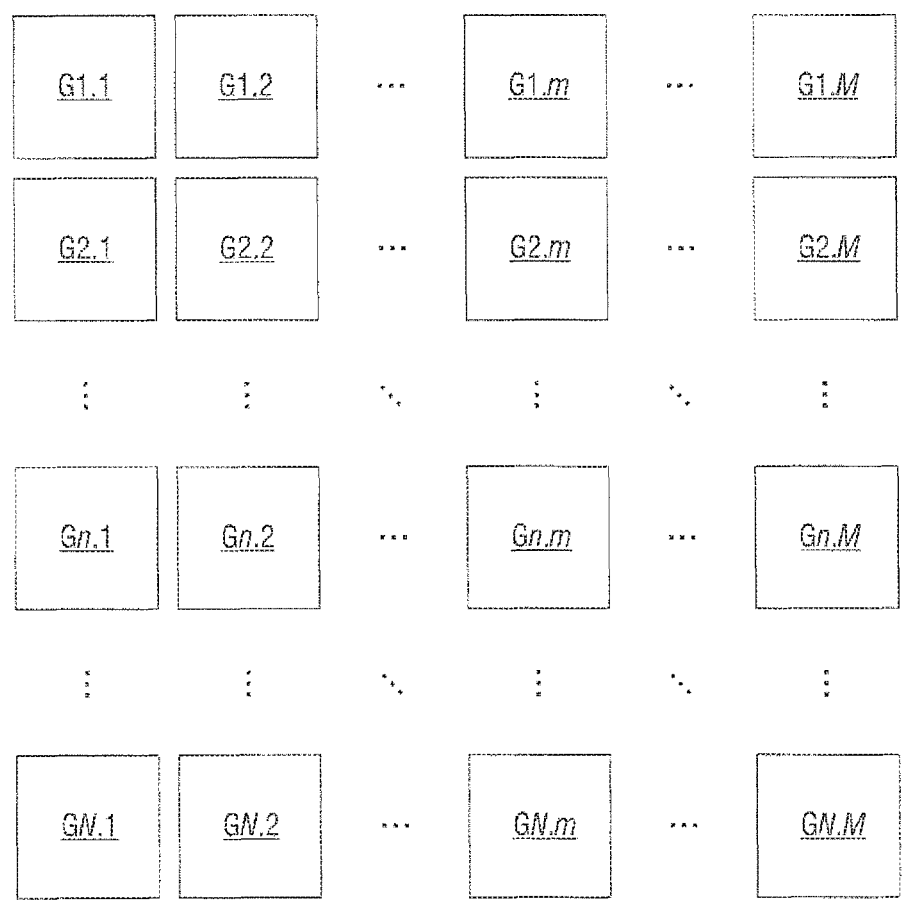
FIG. 3 shows a schematic view of the splitting of received image data according to embodiments of the present invention.

FIG. 1 shows a schematic view of a general system embodiment of the present invention. Specifically, it is shown a schematic view of a large-scale printing machine 1 that is configured to print a plurality of images on a printing medium 20, for example disposed on a planar support 2. The printing medium 20 can be supplied on a roll-basis or in form of individual sheets and can be any one of suitable and printable medium, including paper, plastic sheets, sheet metal, adhesive foils, and the like. The large-scale printing machine 1 comprises means 130 (i.e. a printer) for printing that includes all the required equipment and components for effecting actual printing of an image on printing medium 20.

Said large scale printing machine 1 may include—according to the respective employed printing technology—conveyor and transport drums, sensors, guides, lasers, LED-arrays, transfer drums, ink-jet nozzles, drying drums, fixation drums, cutting means, etc. Printer 130 also comprises processing and driving means, usually in the form of electronic components and circuits that control and drive the individual components.

Machine 1 is adapted to receive image data 90 from another computer, a network, or a data carrier. The received image data 90 is for images of a list of images and is forwarded to a data distribution unit 110 of a printing processor 100 where it is split up so as to be distributed to a plurality 12 of distinct processing units 120. Each processing unit 120 is adapted to generate printable image data for one or more images from a corresponding portion of input data 90 received from the data distribution unit 110. In other words, a portion of input data 90 defines the content to be printed in association with one or more image(s).

Said one or more image(s) may appear(s), along with a plurality of further images, arranged on the printing medium 20 in an ordered grid for example, or in general, in a predetermined order, wherein each image may have a well-defined arrangement position relative to adjacent or remaining images. Specifically, an ordered grid may consider rows and columns so that along the movement direction of printing medium 20 a plurality of rows of images can be printed, wherein each row can comprise a plurality of columns. In this way, each row comprises a number of images equal to the number of corresponding columns.

Each one of the processing units 120 is adapted to generate printable image data for one or more images as part of an individual printing step. For example, one row may contain 100 images and the plurality 12 of processing unit 120 may comprise two processing units 120. In this situation, each one of the two processing units 120 would ideally process printable image data for 50 images. Any suitable distribution scheme may however apply, considering that, for example, the first processing unit 120 generates printable image data for images 1 to 50, and the second processing unit 120 generates printable image data for images 51 to 100. Also a distribution with regard to even and odd image positions in a row may apply or any other interlaced distribution scheme. Naturally, the number of individual processing units 120 may also be more than two and may even range up to the number of individual images per row. In the latter example, each processing unit 120 would generate printable image data for one image of one row.

Once the processing units 120 have completed the generation of the printable image data for all the images of one row or printing step, printing of the respective row or the corresponding printing step can be authorized. In general, this concept is not restricted to individual rows: likewise, also two or more rows can be processed and authorized in one batch or printing step. In any way, once completely generated, the printable image data for the one or more rows can be forwarded to printer 130 for actual printing.

Alternatively, the printable image data can also be collected and buffered in an optional data storage 121 (e.g. in form of a data base, memory, and the like). Once the generation of all the printable image data for the one or more rows has finished, and all this data is buffered in the data storage 121, it may be sufficient to launch a corresponding command and/or signal toward printer 130, indicating the authorization for printing. Printer 130 may thus be provided with the printable image data 91 from the data storage 121, or printer 130 may independently retrieve the printable image data 91 from the data store 121 in response to receiving the command/signal that authorizes printing.

The data storage 121 can also be employed for further optimizing the usage of the provided processing resources (by means of the processing units). Specifically, when a processing unit 120 has completed processing of image data from a group corresponding to a given sequence, this unit 120 can be instructed to process image data from a corresponding group of a next sequence. The printable individual image data resulting from the completed processing of image data from said group of said given sequence can then be buffered for the corresponding printing step in data storage 121. In a further embodiment the buffering capacity in storage 121 can be sized based on given printing speed of the printer and given image processing speed of the processing units so as to be sufficient to avoid stopping the printing process of the total number of individual images. This may avoid the provision of over-dimensioned resources and, as a consequence, may improve efficiency of the system as a whole.

In one embodiment, printing arrangement data can be provided that defines an arrangement of where the individual images are printed on the printing medium at each printing step. Accordingly, there is considered a step of receiving this printing arrangement data and a step of indexing each individual image data of each group according to said printing arrangement data corresponding to said printing step. The step of indexing is preferably performed when the processing units have completed generation of a set of printable individual image data from a corresponding group and printing step. During the subsequent printing step, the individual images are then printed on the printing medium according to the indexing.

In this way, it can be achieved—despite the advantageous split up of data for and during processing—that individual images of one printing step can be printed according to a specific spatial arrangement on the printing medium. The arrangement is reproduced by indexing the individual images, for example of an individual group, so that the printing means 130 can follow the indexing while printing the individual images sequentially on the printing medium. For example, there can be a one-to-one mapping between the indexes of the indexing and the final arrangement of the individual images printed on the printing medium, so that the printing equipment sequentially accesses the printable image data from one index to a subsequent index. In this way, the arrangement of the individual images on the printing medium can be made independent from the actual grouping of the corresponding stored printable image data.

FIG. 2 shows a schematic view of a general method embodiment of the present invention. Specifically, the general method embodiment provides steps for printing images on a printing medium by means of a printer. The general method embodiment considers a first step S10 (RECEIVING IMAGE DATA) of receiving image data for each image of a list of images to be printed on said printing medium. In step S20 (SPLITTING RECEIVED DATA) the received image data of the list of images is split up into N successive sequences corresponding to N printing steps of M groups of image data of individual images. N is an integer greater than or equal to 1, and M is an integer greater than 1. Each group of image data of a printing step comprises image data of at least one individual image. Therefore, the number of individual images in the M groups of a given printing step corresponds to the total number of images to be printed at this printing step.

In step S30 (DISTRIBUTE DATA) the M groups of image data are, sequentially for each printing step, distribute to, respectively, M distinct processing units. Each processing unit (e.g. an mth processing unit 120 of FIG. 1) sequentially processes in a corresponding step S40-*m* (PROCESS DATA) image data of each individual image data from a received group of image data to generate a corresponding set of printable individual image data. Specifically, if there are M distinct processing units denotable by a number m running from 1, . . . , m, . . . , M then a first processing unit performs the processing step S40-1, an mth processing unit performs the processing step S40-*m* (not shown), and a last processing unit M performs the processing step S40-M.

In a further embodiment of the present invention, step S30 of distributing the M groups of image data to, respectively, the M distinct processing units, may comprise a step of attributing a group of images to a particular processing unit by taking into account the computing/processing capability of said processing unit to minimize a corresponding processing time of said group of images. In this way, distribution can take particularly into account the performance of the provided resources. In a further embodiment, there are provided different types of processing units, each type being specially optimized for a specific type of input image data.

Upon all said M processing units having each completed generation of a set of printable individual image data from a corresponding group of said corresponding printing step, the printer is authorized in step S50 (AUTHOROZE PRINTING) to print the corresponding individual images on the printing medium in a step S60 (PRINTING STEP). The procedure can then continue with distributing in step S31 (DISTRIBUTE DATA) the next M groups, parallel processing the distributed data by means of the distinct processing units and awaiting completion of processing so as to authorize the next printing step. If the printing step S60 fails, e.g. when an error occurs during execution of printing step, a signal can be generated and sent to the printing processor to stop distributing the M groups of image data of a next sequence, corresponding to a next printing step, to the M processing units.

In general and as it is apparent from FIG. 2, input data can be received and actual printing take place at the same time as printable image data is generated. Specifically, while printing is still in progress in step S60, the distribution and processing of next data can commence with step S31.

Likewise, further data can be received at any time in a step S11 (RECEIVING IMAGE DATA) which can be likewise be split in a step S21 (SPLITTING RECEIVED DATA), so as to be ready for further processing with step S31. It is to be noted, however, that the further processing with step S31 may also take place from data already received in split in steps S10 and S20. In other words, data can be received and split in one procedure or data can be received and split in a continuous or repeated fashion.

As a result, actual printing can start much faster as in conventional concepts that consider generating the printable image data beforehand, i.e. prior to initiating actual printing. As shown in FIG. 2, actual printing can commence already with step S60, whereby a remainder of data received is still subject to processing with steps S31, etc. Further, actual printing of already generated printable image data can take place simultaneously to generating next printable image data. In this way, not only the processing resources are employed much more efficiently, but also the printing resources (energy, medium, ink, toner, etc.). Specifically, there is no need for pausing or halting large-scale printing machines, which, usually, caused a high volume of waste printing medium.

FIG. 3 shows a schematic view of the splitting of received image data according to embodiments of the present invention. In general, a grid structure is formed having M columns and N rows, where both M and N are integers, and N equals at least 1 (N≥1) and N equals at least 2 (N>1). The shown ordered grid is thus structured into rows and columns. In the shown configuration, the grid has M vertical columns and N horizontal rows. Using an index n.m, where n runs from one to the number N of rows, and m runs from one to the number M of columns, the individual groups of image data can be denoted as Gn.m, running from G1.1 to GN.M. Each group of image data Gn.m comprises image data of at least one individual image. Thus, each group Gn.m comprises the data for printing one or more images.

Given the structure of splitting the data into the groups, one row of groups, i.e. the groups of data Gn.1 to Gn.M, comprise that data for the images to be printed in one printing step. In an embodiment of the present invention, a row of images is printed in one printing step on a printing medium. The printing medium moves along a direction perpendicular to the direction of the row. As a consequence, the medium can be printed with one row after another as the medium moves along the principal printing direction. While on printing step is executed by the printer, the printable image data for the next printing step can be generated by the printing processor. In a way, the printer itself may determine the extent of one printing step, i.e. the configuration of the printer may require a certain amount of printable image to be present so that a minimum of printing action can be executed.

For example, a conventional laser printer may require printable image data for one page, since the sequence of exposing the drum, transferring the toner thereto and to the printing medium, and fixating does usually not allow for suspending and resuming the operation somewhere in the course of printing one page. Likewise, large-scale printing machines print at least a band spanning the printing medium width, since printing only a part of the band and rewinding the printing medium at a later point in time for completing the band is usually not feasible. Specifically, the printer can have a plurality of printing heads, wherein each printing head sequentially prints individual images on the printing medium.

As will be appreciated, the number of M groups may thus usually span the printable width (or: target width) of the printing medium. The individual images may either be separated by a given clearing/margin or may be directly adjacent to each other, depending on the further intended processing, including for example cutting into individual parts. Likewise, the vertical arrangement in N rows may, for example, span a printable vertical height or target height of one sheet of the medium, or, in case the medium is provided in an "endless" form on a roll-basis, the number N of rows may span virtual sheets on the endless roll medium, or, may as well be increasing continuously as long the endless roll printing medium is fed and printed. In general, however, the nth row of groups corresponds to one printing step.

The present embodiments do not pose a limitation on how the overall input data is received. Mainly, the individual portions of input data may be received sequentially, as a whole, in parts, or even in the form of compressed and/or command data. As long as the images to be printed permit, the input data may also be received in the form of a template and corresponding individualization information. For example, an authentication certificate may comprise a constant image part which is the same for all images to be printed. At the same time, each authentication certificate may comprise an individual part, for example a serial number or a bar code, which could be then identified as the above-mentioned individualization information. In such situations, the printable image data would then be generated for all images to be printed using the same template and for each individual image the corresponding individualization information.

Once there is available the input data for generating the printable image data for printing the images of a printing step, the received input data can be split, re-arranged, or re-processed so as to distribute the input data to the processing units. Assuming, for example, the printing direction pointing from rows with a lower number to rows of a higher number, the distribution to the processing units may start with the input data for generating at least the first row of images G1.1 to G1.M. At the same time, however, also more than one row may be processed in one batch so that the input data can also be distributed to the plurality of processing units from the input data for generating printable image data for more than one row. However, these rows will likely be consecutive rows so that, when the generation of printable image data of the corresponding input data batch has been finished, the printing of the respective images can be authorized and processing of the next rows can commence.

As regards the already mentioned embodiment of considering arrangement data and a corresponding indexing of the printable image data, a further example can be given with the aid of FIG. 3. Namely, a case of M=2 can be considered, in which the group G1.2 may contain for example four individual images. Each image of this group G1.2 can be indexed and, according to the indexes, either timely sent to the printing means or accessed by the printing means, so that the over time a specific arrangement of the individual images is reproduced. The mentioned indexing is not limited to take place within individual group Gn.m, but may span also over one or more groups of Gn.1 to Gn.M of one printing step. As a consequence, an advantage can be achieved in that it is known where each individual image is arranged on the printing medium. Also, it may be rendered possible to further print individualized data on each individual image.

FIG. 4A shows a schematic view of large-scale printing machine along a further embodiment of the present invention. The machine 1' comprises all the necessary equipment and components for printing a medium supplied on supply roll 20'. The printing medium is fed to output rolls 21'. In this way, the printing medium is taken continuously from the roll 20', conveyed to printing means (printer) 130', printed and processed, and output to one of the output rolls 21'. Said printer 130' is arranged between the input roll 20' and the output rolls 21'. Further, printing machine 1' comprises a printing processor 10' that is configured to receive image data and to generate the printable image data in line with the corresponding embodiments as described in conjunction with the present disclosure.

The above-described printing processor 10' may either be integrated in the printing machine 1' or may well be external to the machine 1'. For example, the printing processor 10' may be connected to the printing machine 1' via a data link (interface, network, etc.) or situated in close vicinity to the printing machine 1'. A notable constraint can be in any way that the printer 130' needs to receive the printable image data from the printing processor 10' in a timely fashion without delay so that printing can continue uninterrupted. In general, such a printing machine may also include any one of a web cleaner, a splicing table, a quality control unit, a user interface, and the like.

FIG. 4B shows a schematic view of large-scale printing machines along a further embodiment of the present invention. The machine 1" comprises all the necessary equipment and components for printing a medium supplied on individual sheets 20". The printing medium is fed from a stack and is, in this way, the medium is taken quasi-continuously from the stack, conveyed to printing means (printer) 130", printed and processed, and output to an output tray 21". Said printer 130" is arranged between the medium input and the output tray 21". Further, printing machine 1" comprises a printing processor 10" that is configured to receive image data and to generate the printable image data in line with the corresponding embodiments as described in conjunction with the present disclosure. As described for the printing machine 1' of FIG. 3A, the above-described printing processor 10" may be again either integrated in the printing machine 1" or external.

Although detailed embodiments have been described, these only serve to provide a better understanding of the invention defined by the independent claims, and are not to be seen as limiting.

The invention claimed is:

1. A method of large-scale printing images on a printing medium by means of a printer, comprising the steps of:
   receiving image data for each image of a list of images to be printed on said printing medium;
   splitting up the received image data of the list of images into N successive sequences corresponding to N printing steps, N being an integer greater or equal to 1, of M groups of image data of individual images, M being an integer greater than 1, each group of image data of a printing step comprising image data of at least one individual image, the number of individual images in the M groups of a given printing step corresponding to the total number of images to be printed at this printing step;
   sequentially for each printing step, distributing the M groups of image data to, respectively, M distinct processing units, each processing unit sequentially processing image data of each individual image data from a received group of image data to generate a corresponding set of printable individual image data;
   upon all said M processing units having each completed generation of a set of printable individual image data from a corresponding group of said corresponding printing step, authorizing the printer to print the corresponding individual images on the printing medium, thereby the printer is operable to execute printing action as soon as a set of printable individual image data has been generated from M groups of image data by the M processing units, and continue printing action without interruption until the list of images is printed;
   receiving printing arrangement data for printing individual images according to corresponding printing arrangement on the printing medium at each printing step; and
   indexing each individual image data of each group according to said printing arrangement data corresponding to said printing step, when all said M processing units have each completed generation of a set of printable individual image data from a corresponding group of said corresponding printing step, wherein the indexing further spans over one or more said M groups of image data corresponding to one printing step;
   wherein at each printing step the individual image data from the set of printable individual image data are printed on the printing medium in order according to said indexing, where each indexed individual image data of the set of printable individual image data is provided to the printer separately from the other indexed individual image data,
   wherein the method is performed such that arrangement of the individual images on the printing medium is independent from actual grouping of corresponding printable individual image data in the M groups.

2. The method according to claim 1, wherein for each one of the N sequences, each group of image data of at least M−1 groups of image data, respectively distributed to M−1 of the M processing units, contains image data corresponding to a same number of individual image data.

3. The method according to claim 1, wherein in case the printer fails printing an individual image at a given printing step, a signal is sent to stop distributing the M groups of image data of a next sequence, corresponding to a next printing step, to the M processing units.

4. The method according to claim 1, wherein a processing unit having completed processing of image data from a group corresponding to a given sequence, processes image data from a corresponding group of a next sequence, the printable individual image data resulting from the completed processing of image data from said group of said given sequence being buffered for the corresponding printing step.

5. The method according to claim 4, wherein buffering capacity for said buffering of image data is sized based on given printing speed of the printer and given image processing speed of the processing units so as to be sufficient to avoid stopping the printing process of the total number of individual images.

6. The method according to claim 1, wherein the step of distributing the M groups of image data to, respectively, the M distinct processing units, comprises attributing a group of images to a processing unit by taking into account the computing capability of said processing unit to minimize a corresponding processing time of said group of images.

7. A printer for large-scale printing comprising:
   a printing processor for printing images on a printing medium, the printing processor being configured to:

receive image data for each image of a list of images to be printed on said printing medium;

split up the received image data of the list of images into N successive sequences corresponding to N printing steps, N being an integer greater or equal to 1, of M groups of image data of individual images, M being an integer greater than 1, each group of image data of a printing step comprising image data of at least one individual image, the number of individual images in the M groups of a given printing step corresponding to the total number of images to be printed at this printing step;

sequentially for each printing step, distribute the M groups of image data to, respectively, M distinct processing units, each processing unit sequentially processing image data of each individual image data from a received group of image data to generate a corresponding set of printable individual image data;

upon all said M processing units having each completed generation of a set of printable individual image data from a corresponding group of said corresponding printing step, authorize the printer to print the corresponding individual images on the printing medium, thereby the printer is operable to execute printing action as soon as a set of printable individual image data has been generated from M groups of image data by the M processing units, and continue printing action without interruption until the list of images is printed;

receive printing arrangement data for printing individual images according to corresponding printing arrangement on the printing medium at each printing step; and index each individual image data of each group according to said printing arrangement data corresponding to said printing step, when all said M processing units have each completed generation of a set of printable individual image data from a corresponding group of said corresponding printing step, wherein the indexing further spans over one or more said M groups of image data corresponding to one printing step;

wherein at each printing step the individual image data from the set of printable individual image data are printed on the printing medium in order according to said indexing, where each indexed individual image data of the set of printable individual image data is provided to the printer separately from the other indexed individual image data, wherein the printer is configured to perform the large-scale printing such that the arrangement of the individual images on the printing medium is independent from the actual grouping of the corresponding printable individual image data in the M groups.

8. The printer of claim 7, wherein the printing processor is further configured so that for each one of the N sequences, each group of image data of at least M−1 groups of image data, respectively distributed to M−1 of the M processing units, contains image data corresponding to a same number of individual image data.

9. The printer of claim 7, wherein the printing processor is further configured so that in case the printer fails printing an individual image at a given printing step, a signal is sent to stop distributing the M groups of image data of a next sequence, corresponding to a next printing step, to the M processing units.

10. The printer of claim 7, wherein the printing processor is further configured so that a processing unit having completed processing of image data from a group corresponding to a given sequence, processes image data from a corresponding group of a next sequence, the printable individual image data resulting from the completed processing of image data from said group of said given sequence being buffered for the corresponding printing step.

11. The printer of claim 10, wherein the printing processor is further configured so that buffering capacity for said buffering of image data is sized based on given printing speed of the printer and given image processing speed of the processing units so as to be sufficient to avoid stopping the printing process of the total number of individual images.

12. The printer of claim 7, wherein the printing processor is further configured so that the step of distributing the M groups of image data to, respectively, the M distinct processing units, comprises attributing a group of images to a processing unit by taking into account the computing capability of said processing unit to minimize a corresponding processing time of said group of images.

13. A large scale printing machine comprising:
a printer according to claim 7.

* * * * *